United States Patent [19]

Kawakami et al.

[11] Patent Number: 5,312,894
[45] Date of Patent: May 17, 1994

[54] GRANULAR HIGH-MELT-STABLE POLY(ARYLENE THIOETHER-KETONE) AND PRODUCTION PROCESS THEREOF

[75] Inventors: Yukichika Kawakami; Zenya Shiiki, both of Iwaki, Japan

[73] Assignee: Kureha Kagaku Kogyo K.K., Tokyo, Japan

[21] Appl. No.: 52,967

[22] Filed: Apr. 27, 1993

[30] Foreign Application Priority Data

Apr. 30, 1992 [JP] Japan .................................. 138103

[51] Int. Cl.$^5$ ............................................. C08G 16/00
[52] U.S. Cl. ...................................... 528/226; 528/222; 528/224; 528/388
[58] Field of Search ................. 528/226, 224, 222, 388

[56] References Cited

U.S. PATENT DOCUMENTS

| | | | |
|---|---|---|---|
| 4,795,799 | 1/1989 | Cleary | 528/222 |
| 4,812,552 | 3/1989 | Cliffton et al. | 528/226 |
| 4,886,871 | 12/1989 | Satake et al. | 528/226 |
| 5,071,944 | 12/1991 | Cliffton et al. | 528/226 |
| 5,097,003 | 3/1992 | Tomagou et al. | 528/226 |

FOREIGN PATENT DOCUMENTS

| | | |
|---|---|---|
| 0258866 | 3/1988 | European Pat. Off. |
| 287009 | 10/1988 | European Pat. Off. |
| 0293115 | 11/1988 | European Pat. Off. |
| 0306884 | 3/1989 | European Pat. Off. |
| 0311040 | 4/1989 | European Pat. Off. |
| 0346085 | 12/1989 | European Pat. Off. |
| 369620 | 5/1990 | European Pat. Off. |
| 0385299 | 9/1990 | European Pat. Off. |
| 459619 | 12/1991 | European Pat. Off. |
| 63-113020 | 5/1988 | Japan . |
| 64-54031 | 3/1989 | Japan . |
| 1-101332 | 4/1989 | Japan . |
| 1-129027 | 5/1989 | Japan . |
| 1-308428 | 12/1989 | Japan . |
| 1-311124 | 12/1989 | Japan . |
| 1-315420 | 12/1989 | Japan . |
| 2-276826 | 11/1990 | Japan . |

*Primary Examiner*—Harold D. Anderson
*Attorney, Agent, or Firm*—Lowe, Price, LeBlanc & Becker

[57] ABSTRACT

A granular, high-melt-stable poly(arylene thioetherketone) has a solution viscosity ($\eta_{inh}$) of at least 0.30 dl/g, a retention (400° C./20 min) of melt crystallization enthalpy ($\Delta Hmc$) of at least 60%, a melting point of 340°–360° C., a glass transition temperature of at least 125° C. and an average particle diameter of 0.1–2 mm. A production process of a granular, high-melt-stable poly(arylene thioether-ketone) comprises reacting an alkali metal sulfide and a dihalogenated aromatic compound consisting principally of a 4,4'-dihalobenzophenone in an organic amide solvent containing water. In the first step, (1) the ratio of the amount of the charged dihalogenated aromatic compound to the amount of the charged alkali metal sulfide is controlled to 0.95–1.2 (mole/mole), (2) the ratio of the water content to the amount of the charged organic amide solvent is controlled to 1–15 (mole/kg), and (3) the reaction is conducted for 3–30 hours at 180°–260° C. to form a prepolymer having a solution viscosity of at least 0.15 dl/g. In the second step, (1) the ratio of the water content to the amount of the charged organic amide solvent in the reaction mixture is controlled to 7–15 (mole/kg), and (2) the reaction mixture containing the prepolymer is reacted further for 0.05–10 hours in a temperature range of from more than 300° C. to less than 350° C. to form a polymer having a solution viscosity higher than that of the prepolymer by at least 0.03 dl/g. The reaction mixture is then cooled with stirring.

3 Claims, No Drawings

GRANULAR HIGH-MELT-STABLE POLY(ARYLENE THIOETHER-KETONE) AND PRODUCTION PROCESS THEREOF

FIELD OF THE INVENTION

The present invention relates to a granular poly(arylene thioether-ketone) (hereinafter abbreviated as "PTK") having high melt stability. This invention is also concerned with a process for the production of a high-melt-stable PTK in the form of granules by a phase-separation polymerization process. The term "phase-separation polymerization process" as used herein means a polymerization process including at least one polymerization reaction step under conditions that liquid-liquid phase separation between one liquid phase rich in a molten polymer and the other poor in a molten polymer.

BACKGROUND OF THE INVENTION

In the fields of the electrical and electronic industry, the automobile and aircraft industries, the precision instrument industry, and the like, there is a strong demand for provision of PTKs because they are aromatic polymers combining a high melting point with a high glass transition temperature and having excellent mechanical properties.

As production processes of PTKs, there have hitherto been proposed various processes in which an alkali metal sulfide and a 4,4'-dihalobenzophenone are caused to undergo a dehalogenation and sulfurization reaction. Typical patent documents on the production process of PTKs include, for example, (1) U.S. Pat. No. 4,716,212 (Japanese Patent Application Laid-Open No. 113020/1988, EP-A-0258866), (2) U.S. Pat. No. 4,795,799 (Japanese Patent Application Laid-Open No. 101332/1989, EP-A-0306884), (3) U.S. Pat. No. 5,071,944 (Japanese Patent Application Laid-Open No. 276826/1990, EP-A-0385299), (4) U.S. Pat. No. 5,097,003 (Japanese Patent Application Laid-Open Nos. 308428/1989 and 311124/1989, EP-A-0346085), and (5) U.S. Pat. No. 4,886,871 (Japanese Patent Application Laid-Open No. 54031/1989, EP-A-0293115).

In U.S. Pat. No. 4,716,212, there is disclosed a process for obtaining a high-molecular weight PTK, in which an alkali metal sulfide is used in excess of a 4,4'-dihalobenzophenone. The polymer obtained by this process is inadequate in melt stability and is in the form of fine powder having an average particle diameter of 20 μm or smaller.

U.S. Pat. No. 4,795,799 discloses a process for obtaining a high-molecular weight PTK, in which an alkali metal carbonate is caused to coexist in a polymerization system. According to this process, a granular polymer having an average particle diameter of 0.1 mm or greater can be obtained. However, the polymer formed is extremely insufficient in melt stability.

U.S. Pat. No. 5,071,944 discloses a production process of a PTK, in which in the first polymerization step, dehydration is conducted until the water content in a polymerization reaction mixture is reduced to about 0.1–10 wt. % based on the weight of a polar organic solvent and in the second polymerization step, polymerization is then carried out in a state of the low water content. According to this process, a polymer having a high molecular weight can be obtained. However, the polymer formed is in the form of fine powder because of the polymerization condition of such a low water content.

In U.S. Pat. No. 5,097,003, there is disclosed a production process of a PTK, in which a reaction is conducted in a temperature range of as low as 80°–170° C. in an initial stage of polymerization without removing free water and hydration water in an alkali metal sulfide in a polar organic solvent prior to the polymerization by the time the residual rate of an unreacted dihalogenated compound becomes 2% or lower, and thereafter in a temperature being raised up to the range of 200°–345° C. According to this process, preliminary polymerization is conducted at a low temperature as low as 170° C. or lower. Therefore, unreacted monomers, low-molecular weight oligomers and the like remain, so that deleterious side reactions tend to occur in final polymerization, resulting in difficulty in obtaining a polymer good in melt stability. In addition, the long-time reaction at the low temperature in the preliminary polymerization is disadvantageous from the viewpoint of productivity.

U.S. Pat. No. 4,886,871 discloses a process for obtaining a PTK good in melt stability, in which polymerization conditions such as a water content, a charge ratio of monomers and a polymerization temperature are suitably to be selected. However, this process requires to control the polymerization temperature within a range of 60°–300° C., preferably 150°–290° C., more preferably 220°–280° C. It is therefore difficult to obtain a granular polymer with practical yield. For getting a granular PTK, a polymerization reaction system is to be heated to a temperature at least higher than 300° C. in the presence of a relatively great amount of water in the final stage of the polymerization.

The melt stability of a PTK can be evaluated by its maintenance of crystallinity after holding the polymer for a certain period of time in a molten state, for example, the retention of melt crystallization enthalpy (ΔHmc). If the PTK is low in retention of melt crystallization enthalpy and hence poor in melt stability, conventional melt processing techniques such as extrusion, injection molding and melt spinning can not be applied to such a polymer.

If a polymer formed is in the form of fine powder on the other hand, difficulty of the handling of the polymer is significant upon filtrating, washing, drying, transporting, or charging of the polymer during the polymer collection process after polymerization, so that expensive equipments, complicated operations, long treatment time and the like are required. Further in forming or molding and processing, the finely powdered polymer is difficult to handle and tends to cause many troubles such as making weighing difficult or forming block in a hopper, and hence requires an extruder equipped with a compactor or the like. Therefore, it is extremely important from the viewpoint of productivity and economy to obtain a polymer in the form of granules from a polymerization reaction system.

As a method of granulating a PTK after completion of the polymerization reaction, there has been proposed in EP-A-0311040 (Japanese Patent Application Laid-Open Nos. 129027/1989 and 315420/1989) a treatment process in which the PTK is heated in a polar organic solvent to liquefy it, the resulting liquid mixture is added with a separating agent such as water, and the temperature is lowered to solidify the polymer. However, this treatment process involves a problem that the polymer is subjected to significant deterioration, when the PTK is dissolved molecularly and exposed to such a high temperature as over 300° C. before added the separating agent. Therefore, such a treatment process lowers the melt stability of the PTK and is hence hard to provide a PTK sufficiently high in retention of melt crystallization enthalpy.

As described above, it has been very difficult to provide a PTK having high melt stability as granules so far.

OBJECTS AND SUMMARY OF THE INVENTION

It is an object of this invention to provide a granular poly(arylene thioether ketone) having high melt stability, and a production process thereof.

The present inventors have carried out an extensive investigation as to a process for producing a granular PTK having high melt stability.

As a result, it has been found that in a production process of a PTK, in which an alkali metal sulfide is reacted with a dihalogenated aromatic compound consisting principally of a 4,4'-dihalobenzophenone in an organic amide solvent containing water, it is effective to conduct a polymerization reaction in accordance with a two-step polymerization process under specific conditions. More specifically, the two-step polymerization process comprises (1) in the first step, first of all conducting a polymerization reaction in a temperature range of 180°–260° C., in which the reaction of the alkali metal sulfide with the 4,4'-dihalobenzophenone actively takes place, but a polymer formed is not deteriorated by an unreacted alkali metal sulfide and the like, thereby forming a polymer (prepolymer) having a molecular weight sufficient to create liquid-liquid phase separation between two liquid phases consisting of a polymer melt phase and a solvent phase in a step subsequent to the first step, and (2) in the second step, forming the liquid-liquid phase separation between one liquid phase rich in a molten polymer and the other poor in a molten polymer in a temperature range of from more than 300° C. to less than 350° C., in which the prepolymer is sufficiently melted, but lo the solvent and the polymer are not significantly deteriorated under heat, and in a condition that a great amount of water coexists, thereby causing the prepolymer to efficiently undergo a condensation reaction so as to continue the polymerization reaction in the state of the phase separation until a polymer having a molecular weight significantly higher than that of the prepolymer is formed.

In the second step, in order to form the liquid-liquid phase separation, it is permissible to add water, if the coexisting water is insufficient, so as to adjust the water content to at least 7 moles per kg of the organic amide solvent. In the polymerization reaction in the state of the phase separation, the condensation reaction of the prepolymer is allowed to proceed efficiently in the polymer melt phase, thereby forming a polymer having a sufficiently high molecular weight. After completion of the polymerization reaction, the reaction mixture is cooled with stirring. It is speculated that this phase-separation polymerization process can provide a granular PTK having high melt stability.

According to the present invention, there is thus provided a granular, high-melt-stable poly(arylene thioether-ketone) comprising recurring units represented by the following formula [I]:

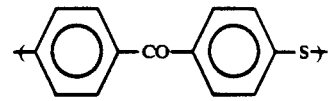

(a) the solution viscosity ($\eta_{inh}$) being at least 0.30 dl/g as determined by viscosity measurement at 30° C. and a polymer concentration of 0.4 g/dl in a 1:1 (by weight) mixed solvent of m-chlorophenol and 1,2,4-trichlorobenzene, (b) the retention (400° C./20 min) of melt crystallization enthalpy ($\Delta Hmc$) being at least 60%, wherein the $\Delta Hmc$ retention (400° C./20 min) is calculated in accordance with the following equation:

$$\Delta Hmc\ retention\ (400°\ C./20\ min) = [\Delta Hmc\ (400°\ C./21\ min)/\Delta Hmc\ (400°\ C./1\ min)] \times 100,$$

wherein (1) melt crystallization enthalpy, $\Delta Hmc$ (400° C./1 min) and (2) melt crystallization enthalpy, $\Delta Hmc$ (400° C./21 min) being determined by means of a differential scanning calorimeter, when the polymer is cooled at a rate of 10° C./min after being held at 50° C. for 5 minutes in an inert gas atmosphere, heated to 400° C. at a rate of 100° C./min and then held, respectively, for 1 minute at 400° C. and for 21 minutes at 400° C., (c) the melting point (Tm) being 340°–360° C., (d) the glass transition temperature being at least 125° C., and (e) the average particle diameter being at least 0.1–2 mm.

According to this invention, there is also provided a process for the production of a granular, high-melt-stable poly(arylene thioether-ketone) comprising recurring units represented by the following formula [I]:

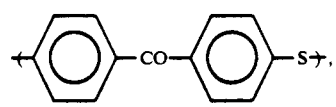

in which an alkali metal sulfide is reacted with a dihalogenated aromatic compound consisting principally of a 4,4'-dihalobenzophenone in an organic amide solvent containing water, which comprises conducting the reaction through the following at least two steps of (A) the first step and (B) the second step:

(A) First step:

the reaction being conducted under the following conditions:

(1) the ratio of the amount of the charged dihalogenated aromatic compound to the amount of the charge alkali metal sulfide being 0.95–1.2 (mole/mole), (2) the ratio of the water content to the amount of the charged organic amide solvent being 1–15 (mole/kg), and (3) the alkali metal sulfide being reacted with the dihalogenated aromatic compound for 3–30 hours at 180°–260° C. in the water-containing organic amide solvent to form a prepolymer having a solution viscosity ($\eta_{inh}$) of at least 0.15 dl/g as determined by viscosity measurement at 30° C. and a polymer concentration of 0.4 g/dl in a 1:1 (by weight) mixed solvent of m-chlorophenol and 1,2,4-trichlorobenzene; and (B) Second step:

the reaction being conducted under the following conditions:

(1) the ratio of the water content to the amount of the charged organic amide solvent in the reaction mixture being 7°–15 (mole/kg), and (2) the reaction mixture containing the prepolymer being reacted further for 0.05–10 hours in a temperature range of from more than 300° C. to less than 350° C. to form a polymer having a solution viscosity ($\eta_{inh}$) higher than that of the prepolymer by at least 0.03 dl/g, and after completion of the second step, cooling the reaction mixture with stirring.

DETAILED DESCRIPTION OF THE INVENTION

Features of the present invention will hereinafter be described in detail.

Production Process of Poly(Arylene Thioether-Ketone)

A. Raw Materials

As principal raw materials for the production of a high-melt-stable PTK in the form of granules according to this invention, are used an alkali metal sulfide, a dihalogen-substituted aromatic compound (dihalogenated aromatic compound), an organic amide solvent and water.

Alkali Metal Sulfide

Illustrative examples of the alkali metal sulfide useful in the practice of this invention include sodium sulfide, lithium sulfide, potassium sulfide, rubidium sulfide, cesium sulfide and mixtures of two or more these compounds. An alkali metal sulfide which may be formed in situ in a reactor is also used.

These alkali metal sulfides can be used as hydrates or aqueous mixtures, or in any anhydrous form. Alkali metal sulfides in the form of a hydrate or aqueous mixture are used after water is removed by distillation or the like prior to the polymerization step if the water content is too high. It is permissible to add a carboxylate, carbonate or the like of an alkali metal or alkaline earth metal to the polymerization system within limits not impeding the object of this invention.

Dihalogenated Aromatic Compound

In the present invention, 4,4'-dihalobenzophenones such as 4,4'-dichlorobenzophenone and 4,4'-dibromobenzophenone are used as a principal raw material. 4,4'-Dichlorobenzophenone is particularly preferred from the viewpoint of reactivity, economy, and physical properties of the resulting polymer.

In this invention, one or more halogen-substituted aromatic compounds other than the 4,4'-dihalobenzophenones may be used in combination as a minor component.

If those whose reactivity to the alkali metal sulfide in a low-temperature range not higher than 260° C. is equal to or higher than that of the 4,4'-dihalobenzophenones are classified as halogen-substituted aromatic compounds of Group (a), dihalogenated aromatic compounds such as 4,4'-dihalodiphenylsulfones, dihalobenzophenones other than 4,4'-isomers and bis(halobenzoyl)benzene isomers belong to Group (a). These dihalogenated aromatic compounds of Group (a) may be used as a minor component. In order to obtain a PTK having a high melting point and a high glass transition temperature, it is however preferred that the proportion of the 4,4'-dihalobenzophenone in the charged dihalogenated aromatic compounds should exceed 98 mole %.

On the other hand, if those whose reactivity to the alkali metal sulfide in the low-temperature range is significantly lower than that of the 4,4'-dihalobenzophenones are classified as halogen-substituted aromatic compounds of Group (b), mono-, di- or tri-halogenated or higher polyhalogenated derivatives of aromatic compounds such as benzene, alkylbenzenes, biphenyl and diphenyl ether belong to Group (b). The halogen-substituted aromatic compounds belonging to Group (b) function only as a substantially inert solvent component in the low-temperature range because of their low reactivity, but become active at the time the temperature of the reaction system containing them has reached a high-temperature range not lower than 290° C. Therefore, these halogen-substituted aromatic compounds of Group (b) can be used as an end-capping agent for a polymer formed.

Organic Amide Solvent

As reaction media useful for the production process of the PTK according to the present invention, aprotic polar organic solvents having excellent heat stability and alkali resistance can be used. Of these, organic amide solvents (including carbamic amides) are particularly preferably used.

As such organic amide solvents, may be mentioned N-methylpyrrolidone, N-ethylpyrrolidone, dimethylimidazolidinone, tetramethylurea, hexamethylphosphoric triamide, dimethylacetamide, etc. Among these organic amide solvents, N-methylpyrrolidone is particularly preferred from the viewpoint of thermal and chemical stability, the smoothness of the polymerization reaction and economy.

B. Polymerization Process and Reaction Conditions

A feature of the production process of the PTK according to this invention is to conduct a reaction of the alkali metal sulfide with the dihalogenated aromatic compound consisting principally of a 4,4'-dihalobenzophenone in at least two steps of (A) the first step and (B) the second step.

In (A) the first step in the production process of the PTK according to the present invention, an unreacted alkali metal sulfide exists in a great amount. However, the deterioration and/or decomposition reaction of the polymer formed is hard to occur because the reaction temperature is in the low-temperature range not higher than 260° C. Most of the alkali metal sulfide is consumed with the formation of a prepolymer. If the reaction temperature in the first step is lower than 180° C., there is a potential problem that the amount of the residual unreacted alkali metal sulfide may increase and deleterious side reactions may occur in the second step.

In (B) the second step in the production process of the PTK according to the present invention, a polymerization reaction is allowed to proceed in the state of the phase separation. It is considered that since the polymer melt phase is separated from the solvent phase to form the state of liquid-liquid phase separation, the polymer formed is mostly condensed efficiently in the polymer rich phase to increase its molecular weight.

The polymerization process and reaction conditions according to the present invention will hereinafter be described more specifically.

(1) Composition of Halogen-Substituted Aromatic Compounds

In the production process of the PTK according to the present invention, a 4,4'-dihalobenzophenone is used as a principal component. In addition, one or more dihalogenated aromatic compounds belonging to Group (a) described above may be used as a minor component if the polymer requires to be modified by copolymerization. In order to obtain a PTK having a high melting point and a high glass transition temperature, it is however preferred that the content of the 4,4'-dihalobenzophenone should exceed 98 mole %, preferably 99 mole % based on the total amount of the charged 4,4'-dihalobenzophenone and the charged dihalogenated aromatic compounds belonging to Group (a).

On the other hand, the halogen-substituted aromatic compounds belonging to Group (b) do not substantially react with the alkali metal sulfide in (A) the first step, but are activated in the high-temperature range in (B) the second step. Since the amount of the residual unreacted alkali metal sulfide is very little in (B) the second step, the halogen-substituted aromatic compounds of Group (b) mostly react with the terminal functional groups of the polymer chain so as to function as an end-capping agent rather than undergo a condensation reaction with the alkali metal sulfide.

Although the halogen-substituted aromatic compounds of Group (b) may be charged prior to the initiation of (B) the second step or during this step, they do not substantially participate in the reaction in (A) the first step, so that they can function as an end-capping agent in (B) the second step even if charged in the reaction system from the beginning of the polymerization reaction. However, the amount of the alkali metal sulfide consumed by the halogen-substituted aromatic compounds of Group (b) may not be included in its charged amount.

(2) Water Content

In (A) the first step of the production process of the present invention, the water content in the reaction system may be within a range of 1-15 (mole/kg) (or 1.8-27 wt. %), preferably 7-15 (mole/kg) (or 12.6-27 wt. %) based on the amount of the charged organic amide solvent. Water contents lower than 1 mole/kg may possibly induce a decomposition reaction. On the other hand, water contents exceeding 15 moles/kg are accompanied by a potential problem that the polymerization reaction may be delayed to a too significant extent to provide a polymer having a high molecular weight. The ratio of the water content to the amount of the charged alkali metal sulfide in the first step may desirably be within a range of, preferably, 2.5-18 (mole/mole), more preferably 7.8-18 (mole/mole).

In (B) the second step of the production process of the present invention, the water content may be within a range of 7-15 (mole/kg) (or 12.6-27 wt. %), preferably 7.5-14 (mole/kg) (or 13.5-25.2 wt. %) based on the amount of the charged organic amide solvent. Water contents lower than 7 moles/kg may possibly result in insufficient phase separation. To the contrary, water contents exceeding 15 moles/kg involve a potential problem that the polymerization reaction may be delayed to a too significant extent to provide a polymer having a high molecular weight. The ratio of the water content to the amount of the charged alkali metal sulfide in the second step may desirably be within a range of, generally, 7.5-18 (mole/mole), preferably, 8-17 (mole/mole), more preferably, 9-16 (mole/mole). If the proportion of the water content to the amount of the charged alkali metal sulfide is lower than 7.5 moles/mole in the second step, there is a potential problem that phase separation may become insufficient. To the contrary, proportions exceeding 18 moles/mole are accompanied by a potential problem that the polymerization reaction may be delayed to a significant extent.

If the reaction system does not contain water in an amount required for the second step after completion of the first step, water is added prior to the initiation of the second step to adjust the water content in a reaction system to the desired amount. However the addition of water in the course of the reaction is troublesome from the viewpoint of production process. Therefore, it is desirable from the viewpoint of productivity and producibility that a sufficient amount of water should be contained from the beginning of the first step to conduct the polymerization reaction without need for any addition of water. (3) Charge Composition The amount of the charged alkali metal sulfide (including those formed in situ) may be within a range of 0.1-5 moles, preferably 0.2-4 moles, more preferably 0.3-2 moles per kg of the amount of the charged organic amide solvent. Amounts less than 0.1 mole/kg result in poor productivity of the polymer and are hence disadvantageous from the economical viewpoint. Amounts greater than 5 moles/kg may possibly result in a reaction system high in viscosity and hence make it difficult to stir the reaction system.

The amount of the charged dihalogenated aromatic compounds including the 4,4'-dihalobenzophenone [excluding the amount of the charged halogen-substituted aromatic compound belonging to Group (b)] may be within a range of 0.95-1.2 moles, preferably 0.98-1.1 moles, more preferably from more than 1.00 mole to less than 1.05 moles per mole of the amount of the charged alkali metal sulfide. If this amount is less than 0.95 mole/mole, there are potential problems that a decomposition reaction may occur, and the melt stability of the resulting PTK may be lowered. To the contrary, amounts greater than 1.2 moles/mole may possibly make it difficult to obtain a polymer having a high molecular weight.

A small portion (desirably not greater than a twentieth of the total amount of the dihalogenated aromatic compounds) of the dihalogenated aromatic compounds may be charged during (A) the first step, right before the initiation of (B) the second step or during (B) the second step. This facilitates the provision of a PTK higher in melt stability.

The above-described halogen-substituted aromatic compounds belonging to Group (b) are substantially inert in (A) the first step. Therefore, the amount of the alkali metal sulfide consumed by these compounds may not be taken into account even when they are caused to exist during (A) the first step. It goes without saying that they can be activated in the high-temperature range of (B) the second step to act as an end-capping agent for the polymer formed.

(4) (A) First Step (Preliminary Step)

The first step (A) of the polymerization is a preliminary process for the phase-separation polymerization. More specifically, in this step, the dihalogenated aromatic compound consisting principally of the 4,4'- dihalobenzophenone is brought into contact with the alkali metal sulfide in the low-temperature range to form a prepolymer having a molecular weight required for the phase-separation polymerization in (B) the second step.

In this step, the polymerization reaction is conducted in a relatively low-temperature range of 180°–260° C., preferably 190°–255° C. so as to reduce the deterioration reaction caused by the alkali metal sulfide existing in plenty and the like. If the reaction temperature is lower than 180° C., there are potential problems that a considerable amount of the residual unreacted alkali metal sulfide may cause a decomposition reaction and a deleterious reaction, by which the melt stability of a polymer formed is deteriorated in the second step, besides the polymerization reaction may be delayed to a significant extent. On the other hand, reaction temperatures higher than 260° C. may possibly induce the deterioration and decomposition of a prepolymer formed.

In this step, the reaction is to be conducted until the solution viscosity ($\eta_{inh}$) of a polymer (prepolymer) formed reaches at least 0.15 dl/g, preferably at least 0.2 dl/g. If $\eta_{inh}$ is lower than 0.15 dl/g, because there is a potential problem that phase separation in (B) the second step may become insufficient.

The reaction time in this step may be within a range of 0.3–15 hours, preferably 0.5–10 hours. Reaction time shorter than 0.3 hour may possibly result in a prepolymer having an insufficient molecular weight. To the contrary, reaction time longer than 15 hours is economically disadvantageous from the viewpoint of productivity.

This prepolymer-foaming reaction is accompanied by the consumption of the alkali metal sulfide which is one of the monomers, and the amount of the residual alkali metal sulfide is hence reduced. This reduction of the amount of the residual alkali metal sulfide also contributes to the reduction of the deterioration reaction in the subsequent second step (B).

Incidentally, one of means for reducing the formation of secondary harmful substances, which are considered to attack the resulting polymer to deteriorate it, to provide a polymer high in melt stability, is to eliminate oxidizing components, in particular oxygen, in both gaseous phase and liquid phase of the reaction system through times of charging of the monomers, solvent and the like and of polymerization as much as possible.

In order to eliminate oxygen in the gaseous phase, it is effective, for example, to completely purge oxygen with an inert gas, to degas the reaction system under reduced pressure, or to make the reaction system airtight throughout the polymerization reaction. In order to eliminate oxygen in the liquid phase (including an organic amide, water, etc.), it is effective, for example, to use a fresh solvent as distilled, to degas the liquid phase by boiling or reduction of pressure, or to dilute or purge oxygen with a pressurized inert gas.

(5) (B) Second Step (Phase-Separation Polymerization Step)

The second step (B) of the polymerization is a process of phase-separation polymerization. More specifically, this step is a process in which the prepolymer formed in the first step is heated and melted to form liquid-liquid phase separation between a polymer melt phase (or a phase rich in a molten polymer) and a solvent phase (or a phase poor in a molten polymer) in the reaction system, and the polymer is condensed by itself in the polymer melt phase.

In this step, the polymer is condensed efficiently mainly in the polymer melt phase to grow into a high-molecular weight polymer.

The formation of the phase separation in this step requires (1) the presence of a prepolymer, (2) the presence of plenty of water and (3) a properly high temperature. (1) The prepolymer is formed in (A) the first step. (2) Water is desirably contained in an amount of at least 7 moles per kg of the amount of the charged organic amide solvent or at least 7.5 moles per mole of the amount of the charged alkali metal sulfide. (3) The temperature is to be within a range of from more than 300° C. to less than 350° C., preferably from more than 303° C. to less than 345° C., more preferably from more than 305° C. to less than 340° C.

Reaction temperatures not higher than 300° C. may possibly result in insufficient liquid-liquid phase separation between the polymer melt phase and the solvent phase. To the contrary, reaction temperatures not lower than 350° C. are accompanied by a potential problem that the solvent and the polymer may be deteriorated under heat.

This second step (B) is conducted until a polymer having a chain length significantly grown compared with the prepolymer is formed. More specifically, judging the molecular weight of the polymer from its solution viscosity ($\eta_{inh}$), the second step may desirably be carried out until a polymer having a solution viscosity ($\eta_{inh}$) higher than that of the prepolymer by at least 0.03 dl/g, preferably at least 0.05 dl/g, more preferably at least 0.1 dl/g is formed. $\eta_{inh}$ of the final polymer formed may desirably be at least 0.30 dl/g.

The reaction time in this step may be within a range of 0.05–10 hours, preferably 0.2–5 hours. Reaction time shorter than 0.05 hour involves a potential problem that the phase-separation polymerization may be conducted insufficiently. To the contrary, reaction time longer than 10 hours is accompanied by a potential problem that the solvent and the polymer may be deteriorated under heat.

After completion of (B) the second step, the resultant polymer is provided in the form of granules by cooling the reaction mixture with stirring.

Poly(arylene thioether-ketone)

A. Chemical Structure

The granular PTK having high melt stability and a high molecular weight, which is obtained by the phase-separation polymerization process according to the present invention, is an aromatic polymer comprising recurring units represented by the following formula [I]:

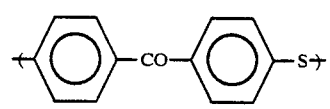

In order to obtain a high-heat-resistant PTK having a high melting point and a high glass transition temperature, the polymer may preferably contain the recurring units of the formula [I] in a proportion greater than 98 basal mole %, wherein the term "basal mole %" means the value, which is calculated supposing the sum of atomic weights of atoms constituting a recurring unit is 1 gram molecule = 1 basal mole (= 100 basal mole %). However, the proportion of the halogen-substituted aromatic compounds used as an end-capping agent and belonging to Group (b) is excepted from this calculation.

This PTK is different from the polymer which is obtained by subjecting a polymer to an oxidation-crosslinking treatment (cure) or the like, so the PTK does not substantially contain any crosslinked structures attributed to the oxidation-crosslinking treatment in its molecule. Therefore, the PTK according to the present invention is significantly superior in melt stability to the high-temperature-oxidation-crosslinked PTK.

In addition, the PTK is superior in melt-spinnability, stretch-processability, weld strength, toughness, etc. to the high-temperature-oxidation-crosslinked PTK. It is however permissible to subject the PTK according to the present invention to an oxidation-crosslinking treatment if needed.

B. Physical Properties

(1) Molecular Weight

When the value of a solution viscosity ($\eta_{inh}$) is used as an index expressing the molecular weight of a polymer, a high-molecular weigh PTK whose $\eta_{inh}$ is at least 0.30 dl/g, preferably at least 0.35 dl/g, more preferably 0.45 dl/g is obtained according to the production process of the present invention. Any polymers whose $\eta_{inh}$ are lower than 0.30 dl/g are insufficient in physical properties such as mechanical properties.

$\eta_{inh}$ is a value determined by viscosity measurement at 30° C. and a polymer concentration of 0.4 g/dl in a 1:1 (by weight) mixed solvent of m-chlorophenol and 1,2,4-trichlorobenzene. The PTK according to the present invention can be dissolved uniformly in the above-described mixed solvent even if it is a high-molecular weight polymer having $\eta_{inh}$ of at least 0.35 dl/g.

(2) Melt Stability

In the application of conventional melt processing techniques, the melt stability is one of extremely important factors from the viewpoint of practical use. Polymers low in melt stability are difficult to apply conventional melt processing techniques such as extrusion, injection molding and melt spinning.

If a polymer is a crystalline polymer, the melt stability of the polymer can be evaluated by its maintenance of crystallinity after holding the polymer for a certain period of time in a molten state, for example, the retention of melt crystallization enthalpy ($\Delta Hmc$).

The PTK according to the present invention is a high-melt-stable polymer whose retention (400° C./20 min) of melt crystallization enthalpy ($\Delta Hmc$) is at least 60%. The $\Delta Hmc$ retention (400° C./20 min) is calculated in accordance with the following equation:

$$\Delta Hmc \text{ retention } (400° C./20 \text{ min}) = [\Delta Hmc (400° C./21 \text{ min})/\Delta Hmc (400° C./1 \text{ min})] \times 100,$$

wherein (1) melt crystallization enthalpy, $\Delta Hmc$ (400° C./1 min) and (2) melt crystallization enthalpy, $\Delta Hmc$ (400° C./21 min) being determined by means of a differential scanning calorimeter, when the polymer is cooled at a rate of 10° C./min after being held at 50° C. for 5 minutes in an inert gas atmosphere, heated to 400° C. at a rate of 100° C./min and then held, respectively, for 1 minute at 400° C. and for 21 minutes at 400° C. The higher the melt stability at 400° C., the higher the $\Delta Hmc$ retention (400° C./20 min) of a polymer.

In general, the molecular weight and melt stability of PTK tend to be contrary to each other. Therefore, it is difficult to attain at the same time the increase of the molecular weight and the enhancement of the melt stability. According to the production process of the present invention, it is however possible to provide a high-melt-stable PTK whose $\Delta Hmc$ retention (400° C./20 min) is at least 60%, preferably at least 70%, more preferably at least 80% even if the PTK is a high-molecular weight polymers whose $\eta_{inh}$ is at least 0.30 dl/g. In this connection, PTKs obtained in accordance with the process described in the prior art such as Japanese Patent Application Laid-Open No. 315420/1989 or EP-A-0311040 (Japanese Patent Application Laid-Open No. 129027/1989) have a $\Delta Hmc$ retention (400° C./20 min) of about 10% or lower, in which after completion of the polymerization reaction, a polymer formed is liquefied at an elevated temperature of 300° C. or higher, and a phase-separating agent is then added to granulate the polymer where the polymer dissolved molecularly and exposed to such a high temperature as over 300° C. before added the separating agent. It is difficult to apply conventional melt processing techniques thereto.

(3) Heat Resistance

When the values of a melting point (Tm) and a glass transition temperature (Tg) are used as indices expressing the heat resistance of a polymer, the PTK obtained in accordance with the production process of the present invention is a high-heat-resistant polymer whose Tm is 340°-360° C., preferably 345°-360° C. and whose Tg is 125° C. or higher.

C. Other Properties

The PTK obtained in accordance with the production process of the present invention is a granular polymer having an average particle diameter of 0.1-2.0 mm, preferably 0.15-1.5 mm.

According to the production process of the present invention, a granular PTK is obtained from a polymerization reaction mixture. Therefore, the production process of the present invention permits extremely simple handling upon after treatments such as filtration, washing, shipping and drying and is hence economical. When this granular PTK is applied in melt processing, an extruder equipped with a conventional hopper can be used. Therefore, its processing cost can be reduced.

The apparent specific gravity of the granular PTK of the present invention is generally within a range of 0.15-0.60 g/cc.

When the PTK according to this invention is once melted under heat and then quenched into a low-crystalline state, it can be dissolved uniformly in an organic solvent such as a mixed solvent of chlorophenol and trichlorobenzene. Accordingly, uniform films and filaments can be obtained from this solution by a casting process or dry-spinning process. The polymer solution can also be used in coating and the like.

Application Fields

The PTKs according to the present invention can be formed or molded either singly or as blends with other thermoplastic resins by conventional melt processing techniques into various products. They may also be subjected to cast processing in the form of a solution. In particular, the PTKs according to the present invention are suitable for use in melt spinning, stretch processing and blow molding. They may also be subjected to injection molding, compression molding, etc. with ease.

The PTKs of the present invention have a high melting point and a high glass transition temperature and are excellent in electronic insulating property, chemical resistance, oxidation resistance, etc., and can hence be used in various fields, for example, as electric and electronic parts (connectors, tape carriers, FPCs, films for magnetic recording, insulating paper, etc.), mechanical parts (camera parts, watch and clock parts, etc.), car parts (carburetors, canisters, reflectors, etc.), etc. In addition to the formed and molded products, they may be used as coating materials, caulking materials and the like in the form of granules or a solution.

ADVANTAGES OF THE INVENTION

According to the production process of the present invention, it is possible to provide granular, high-melt-stable poly(arylene thioether-ketones) by devising their polymerization process. The present invention can also provide poly(arylene thioether-ketones) having high melt stability as granules.

EMBODIMENTS OF THE INVENTION

The present invention will hereinafter be described specifically by the following examples and comparative examples. It should however be borne in mind that the present invention is not limited only to the following examples.

EXAMPLES 1-5

Titanium-lined autoclaves equipped with a stirrer were respectively charged with N-methylpyrrolidone (NMP) as an organic amide solvent, $Na_2S \cdot nH_2O$ (n=5.06) as an alkali metal sulfide and 4,4'-dichlorobenzophenone (DCBP) as a dihalogenated aromatic compound in their corresponding proportions given in Table 1, and optionally with p-dichlorobenzene (p-DCB), 4,4'-dichlorodiphenylsulfone (DCDPS) and distilled water. The compositions of the charged components are as shown in Table 1.

After each of the autoclaves being purged with nitrogen gas, the contents were heated to a predetermined temperature with stirring to perform polymerization in (A) the first step. Incidentally, in Examples 1 and 2, degassing under reduced pressure was conducted for about 10 minute at about 3 Torr after the charging, and each autoclave was then pressurized with nitrogen gas to about 3 atm to initiate the polymerization reaction.

After completion of the respective first steps (A), DCBP, 1,2,4-trichlorobenzene (TCB), NMP and/or water was additionally charged with stirring as shown in Table 1. Right before the initiation of (B) the second step, a small amount of each reaction mixture was sampled out to measure the solution viscosity, $\eta_{inh}$ of each sample.

Each of the reaction mixtures was heated to initiate (B) the second step. After completion of (B) the second step, the reaction mixture was cooled to room temperature with stirring. The reaction mixture wa then taken out of the autoclave, diluted with NMP to increase the volume about two times, and then filtered. The thus-obtained solids were washed with acetone to form a slurry in acetone. The resulting slurry was sifted by a screen having an opening size of 0.1 mm to collect a granular polymer formed. The screen-pass solution was filtered using a filter paper to collect a polymer contained therein. Both polymers thus obtained were separately washed with water and dried under reduced pressure at 80° C.

With respect to the respective polymer samples, their solution viscosities, $\eta_{inh}$, which serve as an index of their molecular weights, were determined in the following manner. Each of the polymer samples was heated and melted at 380° C. for 10 seconds in a hot press, and then placed into iced water to quench it, thereby forming a substantially amorphous sheet having a thickness of about 0.2 mm. A portion of the sheet was subjected to a viscosity measurement with a 1:1 (by weight) mixed solvent of m-chlorophenol and 1,2,4-trichlorobenzene to determine its solution viscosity, $\eta_{inh}$ at 30° C. and a polymer concentration of 0.4 g/dl.

The retention of melt crystallization enthalpy (ΔHmc) of each polymer sample was measured and calculated in the following manner. The polymer sample was held at 50° C. for 5 minutes in a nitrogen gas atmosphere by means of a differential scanning calorimeter (DSC), quickly heated from 50° C. to 400° C. at a rate of 100° C./min, held for 1 minute at 400° to completely melt the polymer sample and then cooled at a rate of 10° C./min to measure its ΔHmc (400° C./1 min). On the other hand, the polymer sample was quickly heated from 50° C. to 400° C. at a rate of 100° C./min in the same manner as described above, held for 21 minutes at 400° C. in the molten state and then cooled at a rate of 10° C./min to measure its ΔHmc (400° C./21 min).

The ΔHmc retention was calculated in accordance with the following equation:

$$\Delta Hmc \text{ retention } (400° C./20 \text{ min}) = [\Delta Hmc (400° C./21 \text{ min})/\Delta Hmc (400° C./1 \text{ min})] \times 100$$

Tm and Tg of each polymer sample were measured by heating another portion of the sheet sample used in the measurement of $\eta_{inh}$ by means of DSC at a rate of 10° C./min from 30° C. to 400° C. With respect to particle properties, the average particle diameters and bulk densities of granular polymer samples having a particle diameter of at least 0.1 mm were determined in accordance with JIS K-0069-31 and JIS K-6721-33, respectively. The results are shown collectively in Table 2.

COMPARATIVE EXAMPLES 1-5

Polymerization and after treatment were conducted in the same manner as in the examples except that polymerization conditions were partly changed as shown in Table 1, thereby collecting respective polymers. However, the processes of degassing under reduced pressure and pressurization with nitrogen gas were performed only in Comparative Examples 1-3. The physical properties of the polymers thus obtained were also measured in the same manner as in the examples. Incidentally, the measurements of Tm, Tg, average particle diameter and apparent specific gravity were conducted only for granular samples (particle diameter: at least 0.1 mm) The results of the physical properties are given collectively in Table 2.

COMPARATIVE EXAMPLE 6

Liquefaction and Resolidification Process

While stirring in an autoclave, 2 moles of 4,4'-dichlorobenzophenone, 189.4 g of an aqueous NaHS solution (2.0 moles of NaHS and 4.4 moles of water), 2.0 moles of NaOH, 2.40 kg of NMP and 6.4 moles of water were polymerized at 250° C. for 3 hours. After completion of the polymerization reaction, the reaction mixture was heated to 300° C. as it is without separating a polymer formed to liquefy the polymer once. Thereafter, the reaction mixture was cooled to 280° C. to introduce 25.0 moles of water under pressure, followed by cooling at a rate of 1° C./min. The reaction mixture was taken out of the autoclave after cooling with stirring, and a polymer collected was washed with water and dried at 125° C. for 5 hours, thereby providing the polymer in the form of granules.

COMPARATIVE EXAMPLE 7

In an autoclave, 0.43 mole of 4,4'-dichlorobenzophenone, 0.443 mole of NaHS flakes, 0.97 mole of water, 0.432 mole of NaOH and 343 g of NMP were heated to 250° C. over 1 hour after the autoclave being purged with nitrogen gas. After the contents were held for 3 hours at 250° C., they were cooled to 200° C., followed by charging of 103 g of an NMP solution containing 3 wt. % of 4,4'-dichlorobenzophenone. The resulting mixture was held for 1 hour at 250° C.

The reaction mixture was filtered to collect solids. The solids were washed with hot water and then dried at 80° C. under reduced pressure, thereby obtaining a polymer in the form of fine powder.

COMPARATIVE EXAMPLE 8

In an autoclave, 2.0 moles of 4,4'-dichlorobenzophenone, 2.0 moles of NaHS flakes, 6.0 moles of water, 1.0 mole of NaOH, 1.0 mole of $Na_2CO_3$ and 2380 g of NMP were held for 3 hours at 250° C. after the autoclave being purged with nitrogen gas. After the contents were heated to 300° C. to liquefy them completely, 600 ml of water as a phase-separating agent was introduced under pressure while stirring the liquefied mixture, followed by its cooling.

The reaction mixture was filtered to collect solids. The solids were washed with acetone and dried at 120° C. under reduced pressure, thereby obtaining a polymer in the form of granules.

COMPARATIVE EXAMPLE 9

In an autoclave, 2.0 moles of 4,4'-dichlorobenzophenone, 2.03 moles of NaHS dihydrate, 2.0 moles of NaOH and 2.46 kg of NMP were held for 1 hour at 250° C. after the autoclave being purged with nitrogen gas. The contents were cooled to 160° C., and a condenser was attached to the autoclave to remove water while heating the contents to about 200° C. An amount of water removed in excess was calculated from the amount of the water collected to additionally charge water, thereby adjusting the water content to 2.9 wt. % based on NMP. The reaction mixture was then held for 2 hours at 250° C. and 0.5 hour at 270° C., and was allowed to cool overnight.

The reaction mixture was poured into water. The resulting solids were collected by filtration and washed with water. Thereafter, the solids were washed with a 1% aqueous solution of NaOH at 120° C. and further with an aqueous solution of $CaCl_2$ at 180° C. for 0.5 hour, and then dried at 100° C., thereby obtaining a polymer in the form of fine powder.

COMPARATIVE EXAMPLE 10

In an autoclave, 5.36 moles of 4,4'-dichlorobenzophenone, 5.26 moles of $Na_2S$, 14.9 moles of water and 7.0 kg of NMP were held for 3 hour at 150° C. to conduct the polymerization of the first step. The contents were then held for 3 hours at 260° C. to conduct the polymerization of the second step. After completion of the polymerization reaction, the reaction mixture were cooled to room temperature and filtered to collect solids. The solids were washed with hot water and dried at 100° C., thereby obtaining a polymer in the form of fine powder.

COMPARATIVE EXAMPLE 11

In an autoclave, 9.0 moles of 4,4'-dichlorobenzophenone, 9.0 moles of $Na_2S$, 45.0 moles of water and 9.0 kg of NMP were held for 2.5 hours at 240° C. after the autoclave being purged with nitrogen gas. Then, 0.9 mole of 4,4'-dichlorobenzophenone, 1.5 kg of NMP and 7.5 moles of water were introduced under pressure. The contents were held for 0.33 hour at 260° C. to react them. After completion of the reaction, the reaction mixture was cooled, added with acetone and filtered to collect solids. The solids were then washed with acetone and with water, and dried at 80° C., thereby obtaining a polymer in the form of fine powder.

The physical property values of the resulting polymers were determined in the same manner as in the examples. The results thereof are shown in Table 2.

TABLE 1

| | (A) First step | | | | | | Additional charge Compound added | | (B) Second step | | | |
|---|---|---|---|---|---|---|---|---|---|---|---|---|
| | Charged amount of NMP (kg) | Charged amount of $Na_2S$ (mol) | Charged amount of DCBP (mol) | Other compound Kind | (mol) | (*1) Water content (mol) | Temp./ time (°C./hr) | Kind | (mol) | $\eta_{inh}$ of pre-polymer (dl/g) | (*2) Total water content (mol) | (*3) Temp./ time (°C./ hr) | Remarks |
| Ex. 1 | 1.00 | 0.754 | 0.755 | — | — | 8.0 | 250/1 | DCBP NMP | 0.012 0.30 | 0.40 | 8.0 | 300-312-300 /0.4 | (*4) |
| Ex. 2 | 1.00 | 0.754 | 0.756 | — | — | 8.5 | 140/1, 180/1, 250/0.5 | TCB NMP | 0.012 0.30 | 0.38 | 8.5 | 300-312-300 /0.4 | (*4) |
| Ex. 3 | 1.00 | 0.754 | 0.756 | p-DCB | 0.038 | 11.1 | 240/1.5 | — | — | 0.36 | 11.1 | 300-312-300 /0.4 | |
| Ex. 4 | 1.00 | 0.754 | 0.755 | — | — | 5.5 | 250/1 | DCBP NMP Water | 0.012 0.30 3.6 | 0.41 | 9.1 | 300-312-300 /0.4 | |
| Ex. 5 | 1.00 | 0.754 | 0.755 | DCDPS | 0.004 | 9.1 | 175/2, 240/1 | DCBP NMP | 0.012 0.30 | 0.35 | 9.1 | 300-312-300 /0.4 | |
| Comp. Ex. 1 | 1.00 | 0.754 | 0.755 | — | — | 5.0 | 250/1 | DCBP NMP | 0.012 0.30 | 0.42 | 5.0 | 300-312-300 /0.4 | (*4) (*5) |
| Comp. Ex. 2 | 1.00 | 0.754 | 0.755 | — | — | 8.0 | 250/0.2 | DCBP NMP | 0.012 0.30 | 0.11 | 8.0 | 300-312-300 /0.4 | (*4) (*6) |
| Comp. | 1.00 | 0.754 | 0.755 | — | — | 8.0 | 250/1 | DCBP | 0.012 | 0.39 | 8.0 | 285-291-285 | (*4) |

TABLE 1-continued

|  | (A) First step | | | | | | Additional charge Compound added | | (B) Second step | | | Remarks |
|---|---|---|---|---|---|---|---|---|---|---|---|---|
|  | Charged amount of NMP (kg) | Charged amount of Na$_2$S (mol) | Charged amount of DCBP (mol) | Other compound Kind | Other compound (mol) | (*1) Water content (mol) | Temp./ time (°C./hr) | Kind | (mol) | $\eta_{inh}$ of pre-polymer (dl/g) | Total (*2) water content (mol) | (*3) Temp./ time (°C./ hr) | |
| Ex. 3 |  |  |  |  |  |  |  | NMP | 0.30 |  |  | /0.5 | (*7) |
| Comp. Ex. 4 | 7.00 | 5.26 | 5.36 | — | — | 14.9 | 150/3 | — | — | 0.22 | 14.9 | 260/3.0 | (*8) |
| Comp. Ex. 5 | 9.00 | 9.00 | 9.09 | — | — | 45.0 | 241/2.5 | — | — | 0.37 | — | — | (*9) |

(Note)
NMP: N-Methylpyrrolidone.
DCBP: 4,4'-Dichlorobenzophenone.
TCB: 1,2,4-Trichlorobenzene.
p-DCB: p-Dichlorobenzene.
DCDPS: 4,4'-Dichlorodiphenylsulfone.
(*1): Including water of hydration in the alkali metal sulfide.
(*2): The sum of the water content in (A) the first step and additional water.
(*3): With respect to Examples 1-5 and Comparative Examples 1-2, indicating the time required to raise the internal temperature of the autoclave from 300° C. to 312° C. and lower it again to 300° C. Similarly, with respect to Comparative Example 3, indicating the time required to raise the internal temperature of the autoclave from 285° C. to 291° C. and lower it again to 285° C.
(*4): After the charging, the processes of degassing under reduced pressure (for about 10 minutes at about 3 Torr) and pressurization with nitrogen gas (about 3 atm) were performed.
(*5): Water content too small.
(*6): $\eta_{inh}$ of the prepolymer was too low, so that a decomposition reaction occurred in (B) the second step.
(*7): The temperature was too low.
(*8): Water content was too small and the temperature was too low.
(*9): No second step (B) was conducted.

TABLE 2

|  | (*10) Content of granules (wt. %) | ΔHmc retention (%) | $\eta_{inh}$ (dl/g) | Tm (°C.) | ΔHmc (J/g) | Tg (°C.) | Average particle diameter (mm) | Bulk density (g/cc) | Remarks |
|---|---|---|---|---|---|---|---|---|---|
| Ex. 1 | 95 | 92 | 0.61 | 350 | 57 | 135 | 0.45 | 0.34 | |
| Ex. 2 | 94 | 92 | 0.60 | 349 | 56 | 133 | 0.55 | 0.30 | |
| Ex. 3 | 93 | 83 | 0.60 | 350 | 54 | 136 | 0.53 | 0.31 | |
| Ex. 4 | 96 | 82 | 0.62 | 351 | 56 | 133 | 0.38 | 0.35 | |
| Ex. 5 | 96 | 82 | 0.59 | 346 | 54 | 138 | 0.58 | 0.30 | (*11) |
| Comp. Ex. 1 | <1 | 91 | 0.48 | 352 | 61 | 135 | — | — | |
| Comp. Ex. 2 | — | — | — | — | — | — | — | — | Decomposed |
| Comp. Ex. 3 | 19 | 92 | 0.49 | 352 | 58 | 134 | 0.30 | 0.36 | |
| Comp. Ex. 4 | <1 | 8 | 0.40 | 350 | 59 | 136 | — | — | |
| Comp. Ex. 5 | <1 | 56 | — | 351 | 61 | 133 | — | — | |
| Comp. Ex. 6 | 91 | 10 | 0.38 | 332 | 40 | 135 | 0.43 | 0.30 | (*12) |
| Comp. Ex. 7 | <1 | 12 | 0.37 | 348 | 41 | 133 | — | — | (*13) |
| Comp. Ex. 8 | 89 | 2 | 0.40 | 347 | 40 | 135 | 0.50 | 0.32 | (*14) |
| Comp. Ex. 9 | <1 | 80 | 0.48 | 350 | 58 | 134 | — | — | (*15) |
| Comp. Ex. 10 | <1 | 3 | 0.41 | 348 | 49 | 135 | — | — | (*16) |
| Comp. | <1 | 91 | 0.50 | 350 | 58 | 135 | — | — | (*17) |

TABLE 2-continued

| (*10) Content of granules (wt. %) | ΔHmc retention (%) | $\eta_{inh}$ (dl/g) | Tm (°C.) | ΔHmc (J/g) | Tg (°C.) | Average particle diameter (mm) | Bulk density (g/cc) | Remarks |
|---|---|---|---|---|---|---|---|---|
| Ex. 11 | | | | | | | | |

(Note)
(*10): A proportion of granules captured on a screen having an opening size of 0.1 mm in the polymer collected.
(*11): A copolymer comprising recurring units I and recurring units II in a proportion of 99.5/0.5 (basal mole %/basal mole %)
Recurring unit I:

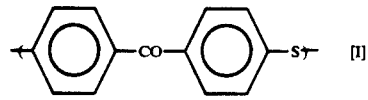

Recurring unit II:

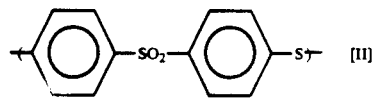

(*12) Liquefaction and resolidification process.
(*13): Excess of Na₂S.
(*14): Addition of Na₂CO₃.
(*15): Water content was too small.
(*16): The temperature in the first step was low.
(*17): The temperature in the second step was low.

We claim:
1. A granular, high-melt-stable poly(arylene thioether-ketone) comprising recurring units represented by the following formula [I]:

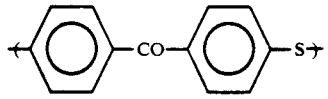

(a) the solution viscosity ($\eta_{inh}$) being at least 0.30 dl/g as determined by viscosity measurement at 30° C. and a polymer concentration of 0.4 g/dl in a 1:1 (by weight) mixed solvent of m-chlorophenol and 1,2,4-trichlorobenzene, (b) the retention (400° C./20 min) of melt crystallization enthalpy (ΔHmc) being at least 60%, wherein the ΔHmc retention (400° C./20 min) is calculated in accordance with the following equation:

ΔHmc (400° C./20 min) = [ΔHmc (400° C./21 min)/ΔHmc (400° C./1 min)] × 100, wherein (1) melt crystallization enthalpy, ΔHmc (400° C./1 min and (2) melt crystallization enthalpy, ΔHmc (400° C./21 min) being determined by means of a differential scanning calorimeter, when the polymer is cooled at a rate of 10° C./min after being held at 50° C. for 5 minutes in an inert gas atmosphere, heated to 400° C. at a rate of 100° C./min and then held, respectively, for 1 minute at 400° C. and for 21 minutes at 400° C., (c) the melting point (Tm) being 340°-360° C.,
(d) the glass transition temperature being at least 125° C., and
(e) the average particle diameter being at least 0.1-2 mm.

2. A process for the production of a granular, high-melt-stable poly(arylene thioether-ketone) comprising recurring units represented by the following formula (I):

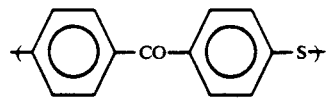

in which an alkali metal sulfide is reacted with a dihalogenated aromatic compound consisting principally of a 4,4-dihalobenzophenone in an organic amide solvent containing water, which process comprises:

conducting the reaction in a first step and a second step, wherein in the first step
(1) the ratio of the amount of the charged dihalogenated aromatic compound of the amount of the charged alkali metal sulfide is 0.95-1.2 (mole/mole),
(2) the ratio of the water content to the amount of the charged organic amide solvent is 1-15 (mole/kg), and
(3) the alkali metal sulfide is reacted with the dihalogenated aromatic compound for 3-30 hours at 180°-260° C. in the water-containing organic amide solvent to form a prepolymer having a solution viscosity ($\eta_{inh}$) of at least 0.15 dl/g as determined by viscosity measurement at 30° C. and a polymer concentration of 0.4 g/dl in a 1:1 (by weight) mixed solvent of m-chlorophenol and 1,2,4-trichlorobenzene; and further wherein in the second step
(1) the ratio of the water content to the amount of the charged organic amide solvent in the reaction mixture is 7-15 (mole/kg), and
(2) the reaction mixture containing the prepolymer is reacted further for 0.05-10 hours in a temperature range of from more than 300° C. to less than 350° C. to form a polymer having a solution viscosity ($\eta_{inh}$) higher than that of the prepolymer by at least 0.30 dl/g; and
after completion of the second step, cooling the reaction mixture with stirring.

3. The process as claimed in claim 2, wherein the ratio of the water content to the amount of the charged organic amide solvent in the first step is controlled to 7-15 (mole/kg).

* * * * *